United States Patent
Kato et al.

(10) Patent No.: US 9,534,920 B2
(45) Date of Patent: Jan. 3, 2017

(54) INFORMATION PROCESSING COOPERATION SYSTEM, INFORMATION PROCESSING TERMINAL AND COMPUTER READABLE MEDIUM FOR THE SAME

(71) Applicant: CLARION CO., LTD., Saitama (JP)

(72) Inventors: Ryohei Kato, Yokohama (JP); Takaaki Shiina, Ageo (JP); Kentaro Daikoku, Kawaguchi (JP); Jun Li, Tokyo (JP); Shinichi Amaya, Higashiyamato (JP)

(73) Assignee: CLARION CO., LTD., Saitama (JP)

( * ) Notice: Subject to any disclaimer, the term of this patent is extended or adjusted under 35 U.S.C. 154(b) by 0 days.

(21) Appl. No.: 14/499,590

(22) Filed: Sep. 29, 2014

(65) Prior Publication Data

US 2015/0094949 A1    Apr. 2, 2015

(30) Foreign Application Priority Data

Oct. 1, 2013    (JP) .................................. 2013-206254

(51) Int. Cl.
*G01C 21/00*    (2006.01)
*G01C 21/36*    (2006.01)

(52) U.S. Cl.
CPC ................................ *G01C 21/3688* (2013.01)

(58) Field of Classification Search
CPC .............. G01C 21/3415; G01C 21/343; G01C 21/3446; G01C 21/3476; G01C 21/3492; G01C 21/3661; G01C 21/3668; G01C 21/3697

(Continued)

(56) References Cited

U.S. PATENT DOCUMENTS

| | | | |
|---|---|---|---|
| 6,957,128 B1 * | 10/2005 | Ito ........................ | G08G 1/0962 340/425.5 |
| 2004/0093154 A1 * | 5/2004 | Simonds ............. | B60R 16/0315 701/532 |

(Continued)

FOREIGN PATENT DOCUMENTS

| | | | |
|---|---|---|---|
| JP | 2012-191349 | * | 9/2011 |
| JP | 2012-162140 | | 8/2012 |

(Continued)

*Primary Examiner* — Muhammad Shafi
(74) *Attorney, Agent, or Firm* — McCarter & English, LLP

(57) ABSTRACT

An information processing cooperation system, comprising: a first information processing terminal mounted on a vehicle; a second information processing terminal having a plurality of types of applications, wherein the first information processing terminal comprises: a condition determination unit configured to determine current conditions of at least one of the vehicle and a user riding on the vehicle; and an activation control unit configured to transmit, depending on the current conditions determined by the condition determination unit, an activation request for activating at least one of the plurality of types of applications to the second information processing terminal, wherein the second information processing terminal comprises: an application activation unit configured to activate an application corresponding to the activation request received from the activation control unit; and an application execution unit configured to execute the activated application in cooperation with the first information processing terminal.

8 Claims, 11 Drawing Sheets

(58) Field of Classification Search
USPC .......................... 701/400–541; 340/988–996
See application file for complete search history.

(56) References Cited

U.S. PATENT DOCUMENTS

| | | | | |
|---|---|---|---|---|
| 2010/0069057 | A1* | 3/2010 | Boiero | H04W 64/00 |
| | | | | 455/419 |
| 2010/0161776 | A1* | 6/2010 | Hamner | H04L 67/025 |
| | | | | 709/222 |
| 2014/0207369 | A1* | 7/2014 | Yuasa | G01C 21/3492 |
| | | | | 701/420 |

FOREIGN PATENT DOCUMENTS

| | | |
|---|---|---|
| JP | 2012-191349 | 10/2012 |
| JP | 2013-108851 | 6/2013 |

* cited by examiner

INFORMATION PROCESSING COOPERATION SYSTEM, INFORMATION PROCESSING TERMINAL AND COMPUTER READABLE MEDIUM FOR THE SAME

CROSS-REFERENCE TO RELATED APPLICATION

This application claims priority under 35 U.S.C. §119 from Japanese Patent Application No. 2013-206254 filed on Oct. 1, 2013. The entire subject matter of the application is incorporated herein by reference.

BACKGROUND

Technical Field

Aspects of the present invention relate to an information processing cooperation system, an information processing terminal and a computer readable medium.

Related Art

An in-vehicle device system comprising an in-vehicle device and a mobile device that are able to intercommunicate with each other has been known. An example of a detailed configuration of such an in-vehicle device system is described, for example, in Japanese Patent Provisional Publication No. 2012-191349A (hereafter, referred to as patent document 1). In the in-vehicle device system described in patent document 1, a mobile device stores predetermined information in a storage unit when an application is terminated. When the mobile device is connected to an in-vehicle device, the in-vehicle device determines whether the predetermined information is stored in the storage unit, and if it is determined that the predetermined information is stored in the storage unit of the mobile device, the in-vehicle device transmits an activation request for an application associated with the predetermined information to the mobile device. When the mobile device receives the activation request, the mobile device activates the application associated with the activation request.

SUMMARY

In the in-vehicle device system described in patent document 1, when the mobile device is connected to the in-vehicle device, a processing unit of the in-vehicle device acquires destination information stored in the storage unit of the mobile device, sets the acquired destination information, and starts a navigation process to the set destination. However, the destination information of the mobile device is information corresponding to the one that had been set when a navigation application was terminated previously. Therefore, the started navigation process is not necessarily suitable for a user's current condition. As information stored in the mobile device used in such an in-vehicle device system, various information concerning the user's condition other than the destination information described above is possible. Therefore, for such an in-vehicle device system, a system capable of operating in a manner suitable for the user's current condition is desirable.

The present invention was made in view of the above described circumstances. That is, the object of the present invention is to provide an information processing cooperation system, an information processing terminal, and a computer readable medium for the information processing terminal that operate in a manner suitable for the user's current condition.

According to an aspect of the invention, there is provided an information processing cooperation system, comprising: a first information processing terminal mounted on a vehicle; a second information processing terminal having a plurality of types of applications. In this configuration, the first information processing terminal comprises: a condition determination unit configured to determine current conditions of at least one of the vehicle and a user riding on the vehicle; and an activation control unit configured to transmit, depending on the current conditions determined by the condition determination unit, an activation request for activating at least one of the plurality of types of applications to the second information processing terminal. The second information processing terminal comprises: an application activation unit configured to activate an application corresponding to the activation request received from the activation control unit; and an application execution unit configured to execute the activated application in cooperation with the first information processing terminal.

With this configuration, the information processing cooperation system is able to operate in a manner suitable for the user's current condition.

According to another aspect of the invention, there is provided an information processing terminal communicating with an external information processing terminal having a plurality of types of applications, comprising: a condition determination unit configured to determine current conditions of at least one of a vehicle and a user riding on the vehicle; an activation control unit configured to transmit, depending on the determined current conditions, an activation request for activating at least one of the plurality of types of applications to the external information processing terminal, and thereby to let the external information processing terminal activate an application corresponding to the activation request; and a cooperation unit configured to execute the activated application in cooperation with the external information processing terminal.

With this configuration, the information processing terminal is able to operate in a manner suitable for the user's current condition.

According to another aspect of the invention, there is provided a non-transitory computer readable medium having computer readable instruction stored thereon, which, when executed by a processor of an information processing terminal communicating with an external information processing terminal having a plurality of types of applications, configures the processor to perform the steps of: judging current conditions of at least one of a vehicle and a user riding on the vehicle; and transmitting, depending on the determined current conditions, an activation request for activating at least one of the plurality of types of applications to the external information processing terminal, and thereby letting the external information processing terminal activate an application corresponding to the activation request; and executing the activated application in cooperation with the external information processing terminal.

With this configuration, the computer readable medium is able to operate in a manner suitable for the user's current condition.

BRIEF DESCRIPTION OF THE ACCOMPANYING DRAWINGS

DETAILED DESCRIPTION OF AN EMBODIMENT

Figure 1:
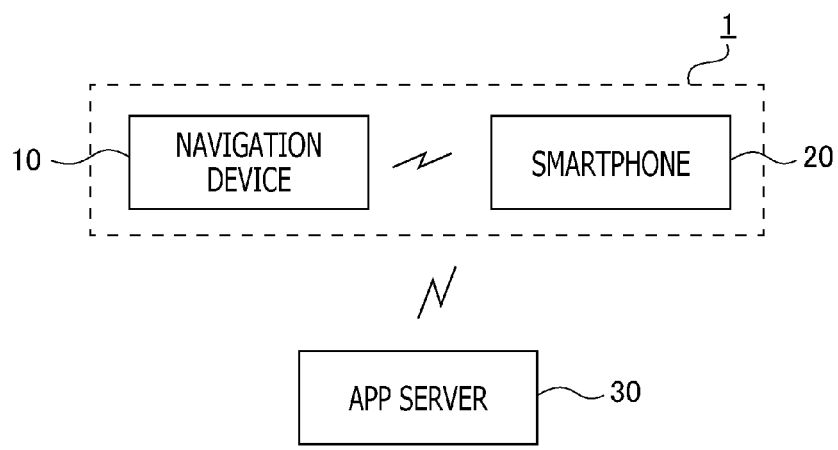
FIG. 1 is a block diagram showing a configuration of an information processing cooperation system according to an embodiment of the invention.

Hereinafter, referring to the accompanying drawings, an embodiment according to the invention will be described. As an embodiment of the present invention, an information processing cooperation system configured with an in-vehicle navigation device and a smartphone is explained by way of example.

Background of the information processing cooperation system according to the embodiment will be described. In development of in-vehicle navigation devices, it is desirable to respond to wide variety of requests from users (such as traders or end users). There exist many demands that differ depending on the users, such as specific demands from the traders or demands that arise from individual feelings. As a way to respond to the many demands that differ depending on the users, customizing the functions of the navigation devices for each user is conceivable. However, such method is in reality difficult considering factors such as costs or lead time. As another way, installing all the functions to the navigation device is conceivable. However, in this case, in addition to problems such as cost, since operations of the navigation devices become complex due to increased number of functions, deterioration of operability arises.

Further, since the display screen size of the in-vehicle navigation device is more limited than for example that of common PCs due to mounting space restriction inside a vehicle, the amount of information that can be displayed on the display screen at a time is limited. As a cost of displaying various types of information on the display screen in association with increased number of functions, a displaying area for navigation information should be reduced. As a result, deterioration of visibility of navigation information arises.

For the purpose of overcoming the above described problems, as an embodiment of the invention, the inventors propose a system that makes use of smartphone which is recently becoming familiar. An outline of the system proposed herein is that functions that satisfy user's demands could arbitrarily be added to the smartphone, and the added functions are activated and executed by cooperation between the navigation device and the smartphone.

Since addition and deletion of the functions are performed for the smartphone, the navigation device needs not be customized in accordance with the functions, and excess functions need not be installed on the navigation system. Additionally, since information of added functions is displayed on the display screen of the smartphone, a displaying area for navigation information needs not be reduced on the navigation device side. Meanwhile, information of added functions could be displayed on the display of the navigation device without reducing the displaying area for navigation information, depending on a size of the display and a displaying layout of the navigation device.

However, it is undesirable for a user to concentrate on operations of the smartphone while driving the vehicle. Therefore, in the embodiment of the information processing cooperation system, required smartphone operation by a user is kept to a minimum, so as not to interrupt driving the vehicle.

Overall Configuration of Information Processing Cooperation System 1

FIG. 1 is a block diagram showing a configuration of the information processing cooperation system 1 according to the embodiment. As shown in FIG. 1, the information processing cooperation system 1 comprises a navigation device 10 mounted on a vehicle, and a smartphone 20 owned by a user. Devices that configure the information processing cooperation system 1 are not limited to the navigation device 10 and the smartphone 20, and could be replaced with different types of devices that are able to intercommunicate with each other. For example, the smartphone 20 may be replaced with a tablet PC or a laptop PC. Further, to the information processing cooperation system 1 (i.e., the navigation device 10 and the smartphone 20), an APP server 30, which manages various applications that execute additional functions for the information processing cooperation system 1, is connected via the internet.

Configuration of Navigation Device 10

Figure 2:
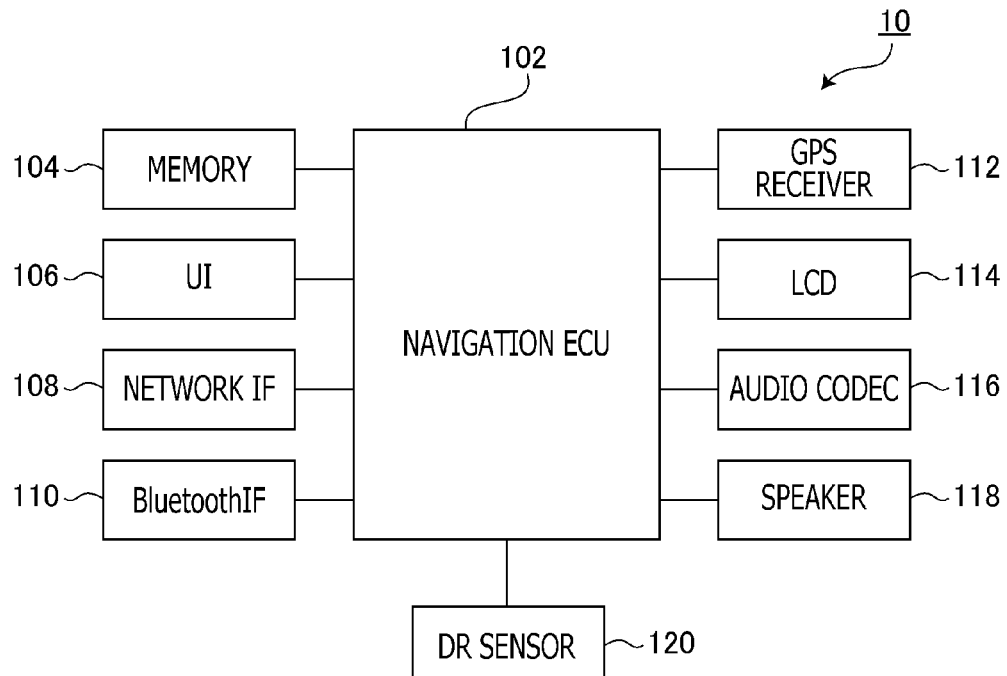
FIG. 2 is a block diagram showing a configuration of a navigation device configuring the information processing cooperation system according to the embodiment of the invention.

FIG. 2 is a block diagram showing a configuration of the navigation device 10. As shown in FIG. 2, the navigation device 10 comprises a navigation ECU (Electronic Control Unit) 102, a memory 104, a UI (User Interface) 106, a network IF (Interface) 108, Bluetooth (registered trademark) IF 110, a GPS (Global Positioning System) receiver 112, an LCD (Liquid Crystal Display) 114, an audio codec 116, a speaker 118 and a DR (Dead Reckoning) sensor 120.

In the memory 104, various programs such as an initial program loader and a main program, and various data (such as map data or reference values for the programs) which the navigation ECU 102 uses for processes, are stored. Immediately after power activation of the navigation device 10, the navigation ECU 102 executes the initial program loader stored in the memory 104 to initialize each hardware component. After that, the navigation ECU 102 loads the main program stored in the memory 104 into a predetermined work area, and executes control for the overall navigation device 10 and various processes by executing the loaded main program.

For example, the navigation ECU 102 executes rendering of the map data read out from the memory 104 and displaying of the map data on the LCD 114, as well as measuring of the current position (of a vehicle on which the navigation device 10 is mounted) using GPS positioning data collected by the GPS receiver 112 at predetermined time intervals, and overlays (i.e., map matching) the measured vehicle position on the road in the map displayed on the LCD 114. Meanwhile, for the measurement of the vehicle position, DR measurement data by the DR sensor 120 could be used in place of or along with the GPS positioning data. The DR sensor 120 comprises, for example, a gyro sensor that measures angular speed with respect to an orientation on a horizontal plane of the vehicle, or a vehicle speed sensor that detects rotating speed of the left and right wheels of the vehicle.

When the navigation ECU 102 is executing navigation, a route in the map displayed on the LCD 114 is highlighted. The navigation ECU 102 periodically measures the vehicle position using the positioning data, and displays the map that matches the measured vehicle position on the LCD 114. If the vehicle position deviates from the route, the navigation ECU 102 re-searches and resets the route using Dijkstra's algorithm. Also, the navigation ECU 102 is capable of downloading the latest map data by periodically connecting to a predetermined map server on the internet via the network interface 108.

The UI 106 is an operation unit for receiving user's inputs, which generates signals corresponding to operation inputs and outputs the signals to the navigation ECU 102. This type of operation unit includes various UI which use hardware, software, or a combination of hardware and software. Specifically, the UI 106 are mechanical switch keys or membrane keys which may be provided on a front panel of the navigation device 10, GUIs (Graphical User Interface) provided under touch panel use environment, a remote controller provided with operation keys, or the like.

The audio codec 116 decodes various audio data such as audio data for navigation, and reproduces sound of the decoded audio data through the speaker 118.

Configuration of Smartphone 20

Figure 3:
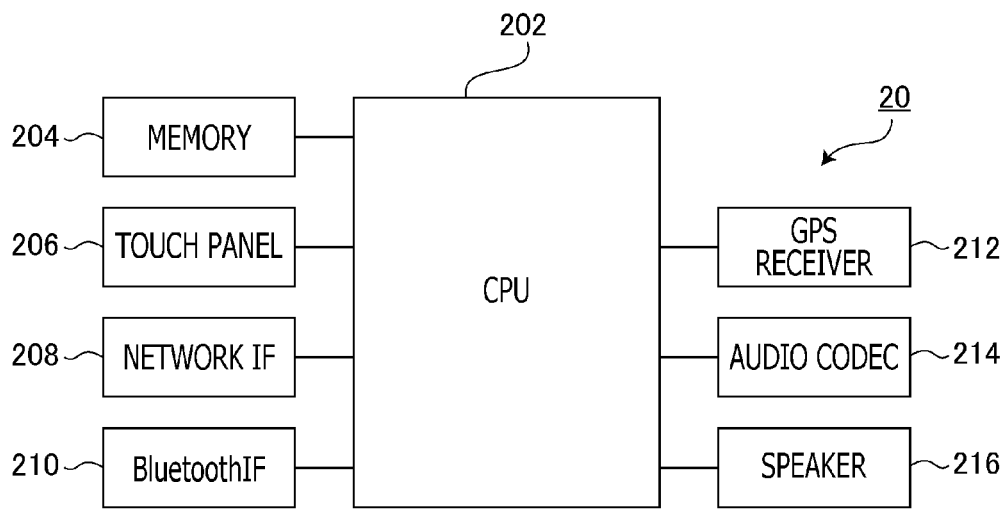
FIG. 3 is a block diagram showing a configuration of a smartphone configuring the information processing cooperation system according to the embodiment of the invention.

FIG. 3 is a block diagram showing a configuration of the smartphone 20. As shown in FIG. 3, the smartphone 20 comprises a CPU (Central Processing Unit) 202, a memory 204, a touch panel 206, a network IF 208, a Bluetooth IF 210, a GPS receiver 212, an audio codec 214 and a speaker 216.

Immediately after power activation of the smartphone 20, the CPU 202 executes an initial program loader stored in the memory 204 to initialize each hardware component. Next, the CPU 202 loads a main program stored in the memory 204 into a predetermined work area, and executes control of the overall smartphone 20 and various processes by executing the loaded main program.

For example, by executing a web browser stored in the memory 204 in accordance with operation to the touch panel 206 by a user, the CPU 202 can download contents existing on the internet via the network IF 208, and display the downloaded contents on the touch panel 206. The web browser is, for example, a software that is able to interpret HTML (Hyper Text Markup Language) 5, CSS (Cascading Style Sheets), Java Script (registered trademark) and the like, and their related specifications.

Configuration of APP Server 30

As shown in FIG. 1, the APP server 30 is connected to the information processing cooperation system 1 (the navigation device 10 and the smartphone 20) via the internet. The APP server 30 is provided with an application DB (Data Base). The application DB manages various applications for executing additional functions for the information processing cooperation system 1. By accessing to the APP server 30 using the web browser, the smartphone 20 is able to download applications from the application DB in accordance with requests and install them.

Cooperation Process Between Navigation Device 10 and Smartphone 20

Figure 4:
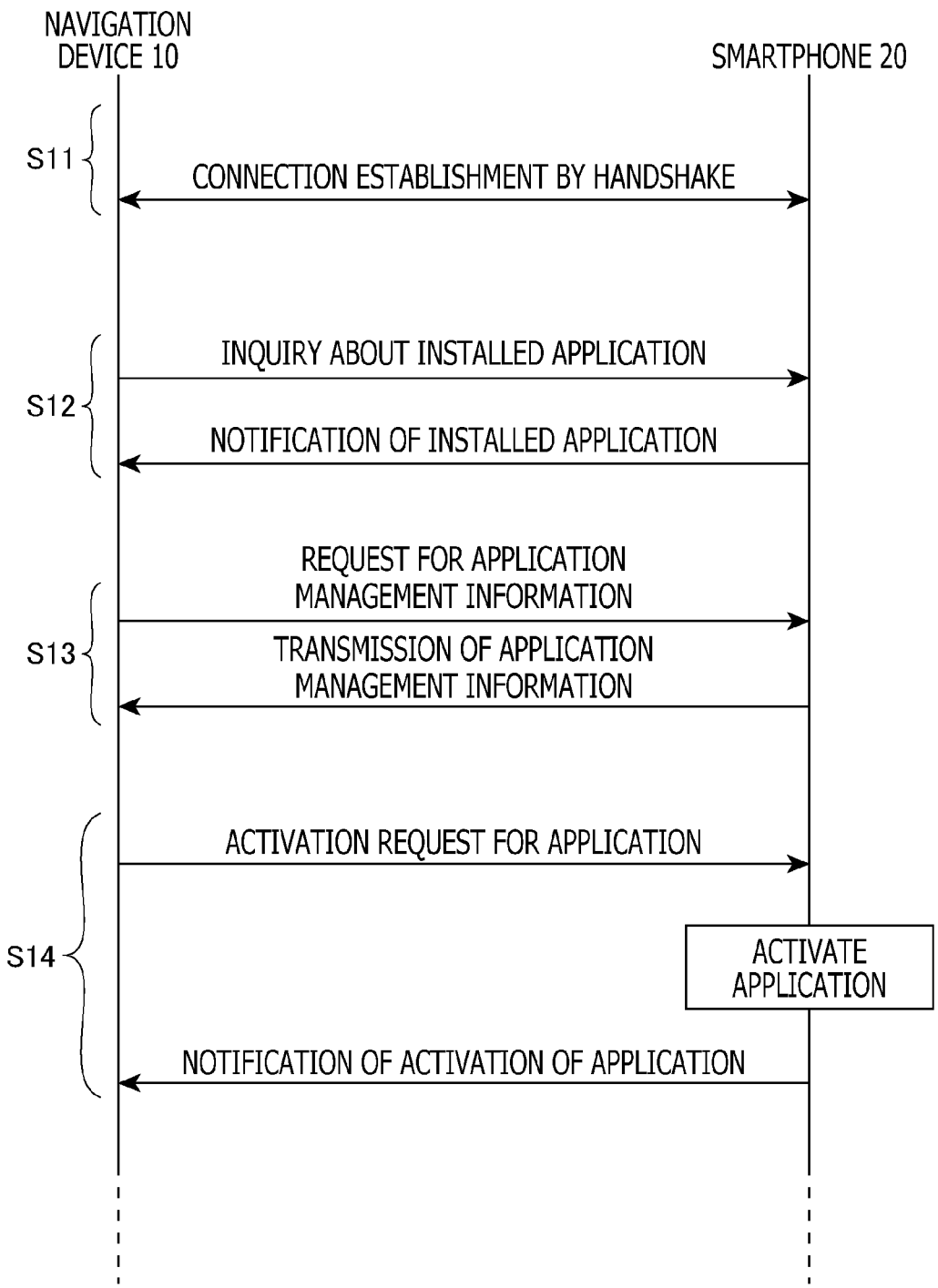
FIG. 4 shows a sequence of a cooperation process between the navigation device and the smartphone executed according to the embodiment of the invention.

As shown in each of FIG. 2 and FIG. 3, the navigation device 10 has the Bluetooth IF 110, and the smartphone 20 has the Bluetooth IF 210. The Bluetooth IFs 110 and 210 are communication modules for connecting the navigation device 10 and the smartphone 20 respectively to devices placed within a wirelessly connectable distance (for example, within 10 m). After piconet synchronization establishment between the navigation device 10 and the smartphone 20, the navigation device 10 and the smartphone 20 execute predetermined cooperation processes by intercommunicating via respective Bluetooth IFs. FIG. 4 shows a sequence of the cooperation process between the navigation device 10 and the smartphone 20. It should be noted that the communication method between the navigation device 10 and the smartphone 20 is not limited to Bluetooth, but other wire communication methods or wireless communication methods such as USB (Universal Serial Bus) or Wi-Fi can also be used.

S11 in FIG. 4 (Connection Establishment)

The navigation device 10 and the smartphone 20 establish connection by handshake. In the handshake, check of type of connecting device (such as type or version of OS (Operating System)) or arrangement of various parameters such as information transfer rate, code type, parity, protocol, and setting values are performed.

S12 in FIG. 4 (Application Inquiry)

After the connection establishment with the smartphone 20, the navigation device 10 makes inquiry about applications to the smartphone 20. Specifically, the navigation device 10 makes inquiry about applications, in a type of smartphone 20 checked in the handshake, with which the navigation device 10 is able to execute cooperation processes. In response to an inquiry from the navigation device 10, the smartphone 20 notifies the navigation device 10 of applications which are able to execute cooperation processes with the navigation device 10 and which are installed in the smartphone 20. The navigation device 10 stores notification received from the smartphone 20 in a storage area such as the memory 104.

S13 in FIG. 4 (Application Management Information Delivery)

The navigation device 10 requests the application management information from the smartphone 20. The application management information is information for activation control of applications included in the notification from the smartphone 20, and is stored in a storage area such as the memory 204 of the smartphone 20. The smartphone 20 reads out the application management information in response to a request from the navigation device 10, and transmits the read application management information to the navigation device 10. The navigation device 10 stores the application management information received from the smartphone 20 in a storage area, such as the memory 104 or the like. It should be noted that the smartphone 20 may transmit the application management information to the navigation device 10 in response to establishment of the connection by the handshake. In this case, in step S13, the request for application management information from the navigation device 10 to the smartphone 20 is omitted.

Figure 5:
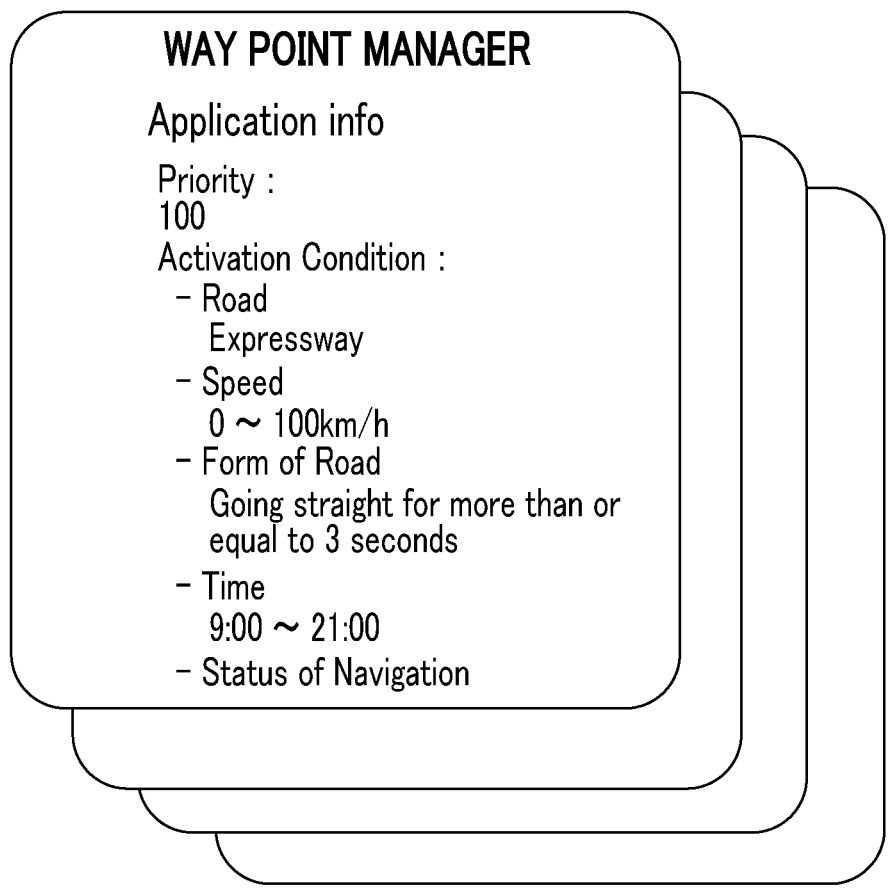
FIG. 5 is a diagram conceptually illustrating application management information.

FIG. 5 conceptually shows the application management information. As shown in FIG. 5, the application management information defines activation conditions or priorities of applications.

The activation conditions are conditions for activating applications, such as conditions relating to a map, a vehicle, or a user. The conditions relating to a map includes, type of road the vehicle is currently driving, number of lanes, angle of curves, traffic control depending on hour, existence of traffic lights within a predetermined distance from current position, existence of railway crossings, existence of intersections, weather at a driving area, and current time. The conditions relating to a vehicle includes, a driving speed of the vehicle, lighting conditions, wiper operation conditions, a gear, and amount of gas remaining. The conditions relating to a user includes behavior patterns or a preference patterns. The behavior/preference patterns are analyzed based on information sequentially gathered by the smartphone 20, such as web access histories or position information (i.e., position information based on positioning data of the GPS receiver 212) in a certain past time period, and are stored in a storage area such as the memory 204. Depending on the activation conditions, it is possible to restrict application activation when a user should concentrate on driving, such as while driving in the night or roads for which a driver should handle a steering wheel many times, zones on a recommended route where a lot of turning points exist, zones where a lot of passersby exist, or when driving in an area near schools or kindergartens.

Activation or execution of applications could compete in conditions such as when there are a plurality of applications which satisfy the activation conditions. In view of such conditions, the priorities define priority orders of applications to be activated (and executed).

Definitions of the application management information (i.e., the activation conditions or the priorities) are for example set by default, but it is possible for a user to arbitrarily change the definitions. Further, the application management information may be stored in the navigation device 10 in advance, and may also be stored in the APP server 30. In the latter case, the APP server 30 stores the application management information for each user (i.e., for each information processing device such as smartphone), and transmits the application management information corresponding to the user designated by the request from the navigation device 10. The APP server 30 may manage not only the application management information but also the definition information such as the activation conditions or the priorities suitable for respective applications. For example, the smartphone 20 periodically accesses to the APP server 30 and downloads the definition information, and updates the application management information stored in a storage area such as the memory 204 using the downloaded definition information.

S14 in FIG. 4 (Application Activation)

Figure 6:
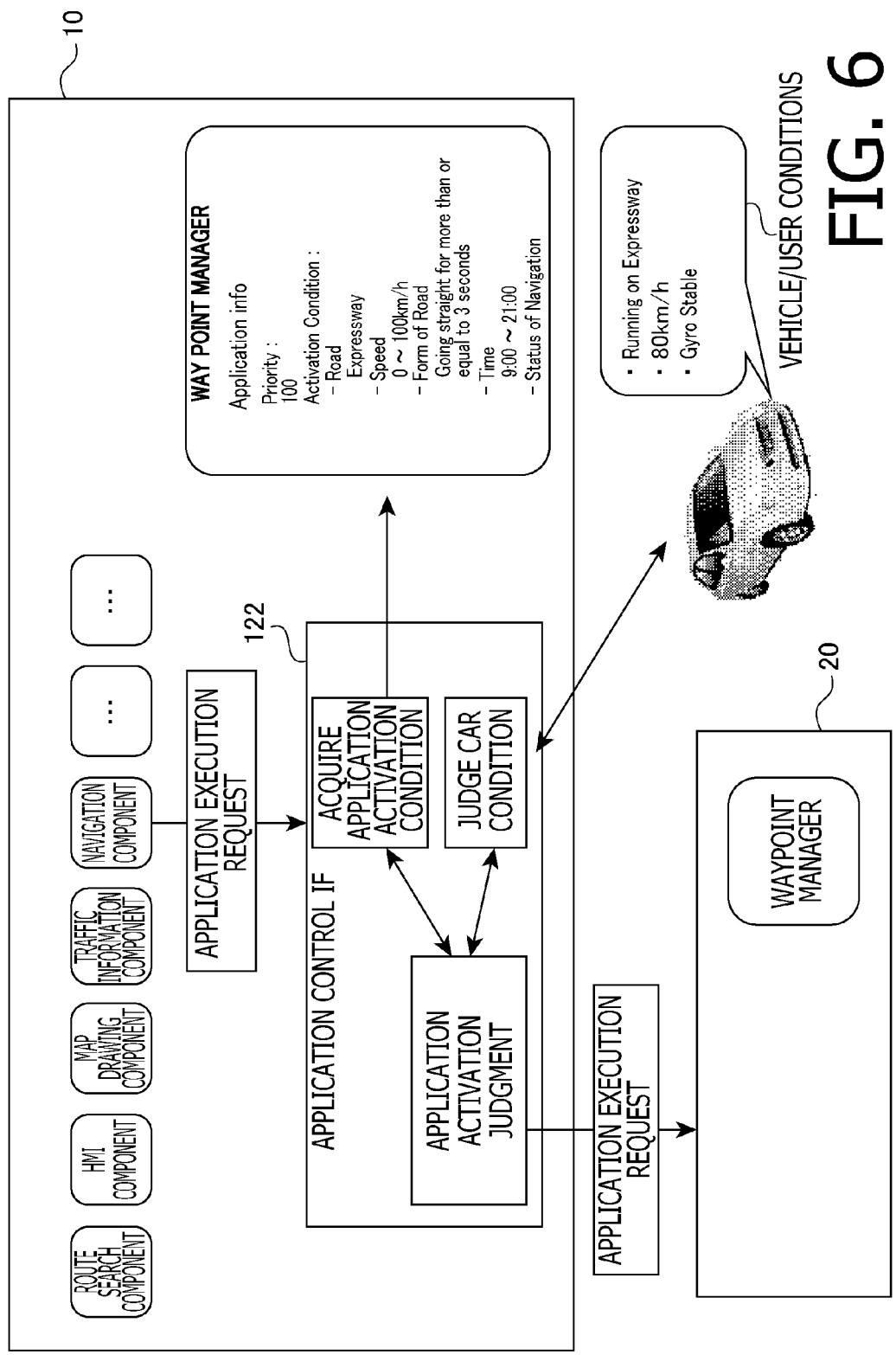
FIG. 6 shows an example of an application activation process.

FIG. 6 shows an example of an application activation process. In the navigation device 10, as a main program for executing navigation processes, various components shown in FIG. 6 are installed. The components includes, for example, a route search component for route search, an HMI (Human Machine Interface) component for displaying, a map drawing component for drawing maps, a traffic information component for processing traffic information, and a navigation component for navigation.

In the navigation device 10, an application control IF 122 (see FIG. 6) defining interfaces between an OS and various components is installed. The application control IF 122 includes acquiring activation conditions included in the application management information, checking current conditions of a vehicle and a user who drives the vehicle (hereinafter referred to as "vehicle/user conditions"), and definitions concerning application activation determination.

A case when an execution request for an application called "WAY POINT MANAGER" is generated from the navigation component is considered. As shown in FIG. 6, the execution request for the "WAY POINT MANAGER" output from the navigation component is input to the application control IF 122. Here, a message format between the application control IF 122 and the components is, for example, a markup language such as XML (Extensible Markup Language). The components convert the execution request to a message through an XML parser.

The application control IF 122 sequentially collects various information from various devices such as the vehicle, the navigation device 10, or the smartphone 20, and periodically checks the vehicle/user conditions using the collected information. Examples of specific information items to be collected and checked include, current position of the vehicle based on the positioning data, various map information included in the map data considering the current position of the vehicle (for example, type of road the vehicle is currently driving, number of lanes, angle of curves, traffic control depending on hour, existence of traffic lights within a predetermined distance from current position, existence of railway crossings, existence of intersections, weather at a driving area, and current time), outputs of the DR sensor (for example, the speed of the vehicle), conditions of various equipment of the vehicle (such as light, wire, gear, gas tank), behavior patterns or preference patterns of the user. The vehicle/user conditions may be checked only when the application execution request is received.

In response to input of the application "WAY POINT MANAGER" execution request as a trigger, the application control IF 122 checks notices received in step S12 in FIG. 4 (application inquiry), and determines whether the application "WAY POINT MANAGER" is installed in the smartphone 20. When it is determined that the application "WAY POINT MANAGER" is installed in the smartphone 20, the application control IF 122 accesses to the application management information stored in the memory 104, and determines whether the vehicle/user conditions satisfy the application "WAY POINT MANAGER" activation conditions. If the vehicle/user conditions satisfy the application "WAY POINT MANAGER" activation conditions, the application control IF 122 transmits an application "WAY POINT MANAGER" activation request to the smartphone 20. Thus, in the smartphone 20, the application "WAY POINT MANAGER" is activated and executed. On the other hand, if the vehicle/user conditions do not satisfy the application "WAY POINT MANAGER" activation conditions, the application control IF 122 does not transmit the application "WAY POINT MANAGER" activation request to the smartphone 20.

Application execution requests by the components need not be requests for executing specific applications. In this case, when the application execution requests are input from the components, the application control IF 122 accesses to the application management information stored in the memory 104, and searches for applications of which the vehicle/user conditions satisfy activation conditions. The application control IF 122 transmits an activation request of the searched applications to the smartphone 20. The application control IF 122 may transmit an activation request of all the searched applications to the smartphone 20, or transmits an activation request of one application having the highest priority defined in the application management information to the smartphone 20.

Figure 7:
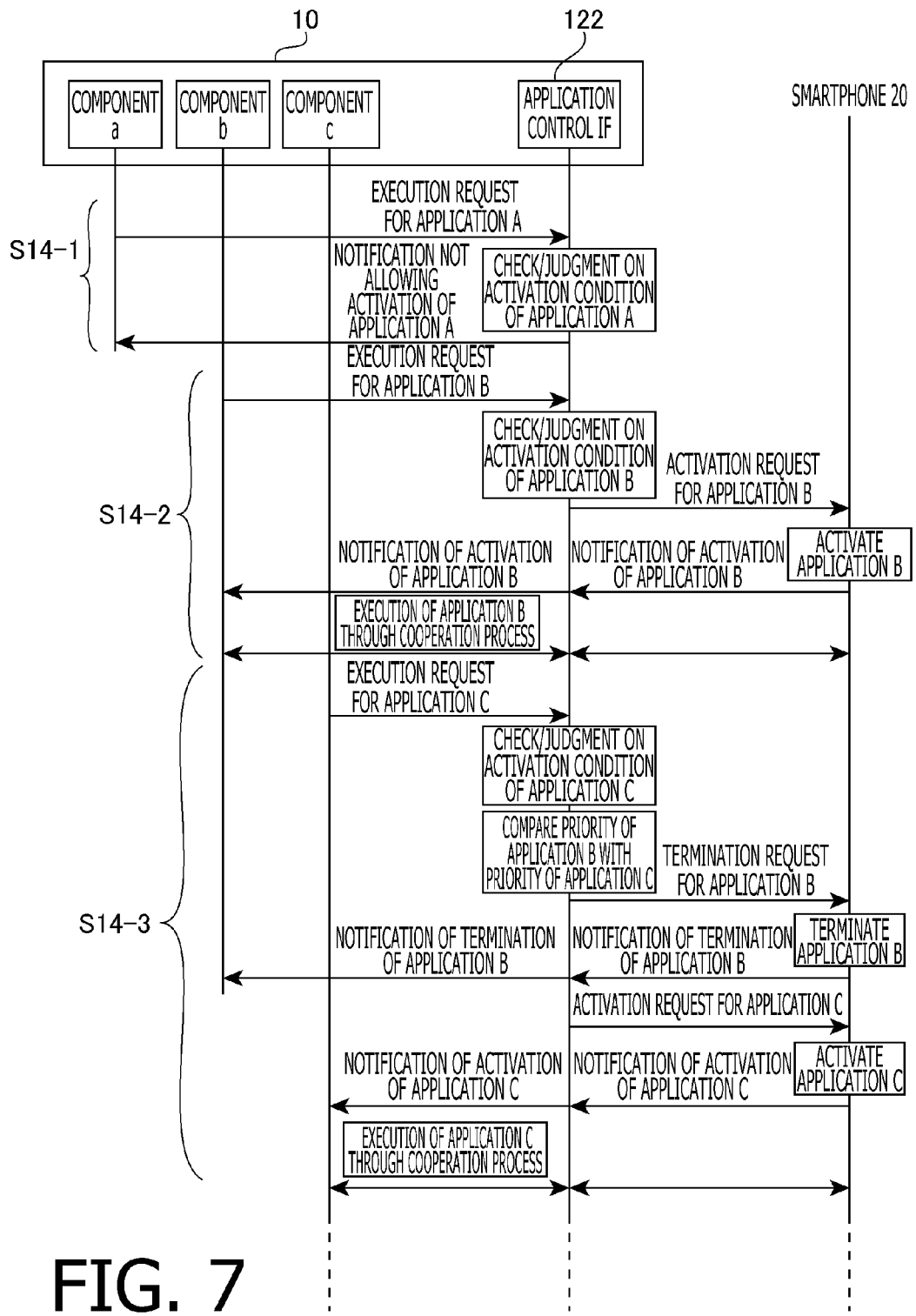
FIG. 7 shows a sequence of activation control and operation control of applications executed between various components of the navigation device, an application control IF, and the smartphone.

FIG. 7 shows a sequence of activation control and operation control of applications executed between various components of the navigation device 10, the application control IF 122, and the smartphone 20. In FIG. 7, as representatives of various components, "component a", "component b", and "component c" are shown. In the example shown in FIG. 7, the component a generates an application A execution request, the component b generates an application B execution request, and the component c generates an application C execution request.

S14-1 (Control of Application A) in FIG. 7

When a predetermined first condition is satisfied, the component a transmits an application A execution request to the application control IF 122. The application control IF 122 checks the received notification at step S12 in FIG. 4 (application inquiry), and determines whether an application A is installed in the smartphone 20.

In the example shown in FIG. 7, the application A is not installed in the smartphone 20, or is installed but the vehicle/user conditions do not satisfy the application A activation conditions. Therefore, the application control IF 122 notifies the component a that the application A was not activated. The component a cognizes that the application A was not executed in the smartphone 20 by receiving the notification.

S14-2 (Control of Application B) in FIG. 7

When a predetermined second condition which is different from the first condition is satisfied, the component b transmits the application B execution request to the application control IF 122. The application control IF 122 checks the received notification at step S12 in FIG. 4 (application inquiry), and determines whether the application B is installed in the smartphone 20.

In the example shown in FIG. 7, the application B is installed in the smartphone 20, and the vehicle/user conditions satisfy the application B activation conditions. Therefore, the application control IF 122 transmits the application B activation request to the smartphone 20. The smartphone 20 activates the application B in accordance with the activation request received from the application control IF 122, and notifies the application control IF 122 of activation of the application B. The application control IF 122 transfers the activation notification received from the smartphone 20 to the component b. After receiving the activation notification, the component b communicates with the smartphone 20 via the application control IF 122, and executes the application B in cooperation with the smartphone 20.

S14-3 (Control of Application C) in FIG. 7

When a predetermined third condition which is different from the first condition and the second condition is satisfied, the component c transmits the application C execution request to the application control IF 122. The application control IF 122 checks the received notification at step S12 in FIG. 4 (application inquiry), and determines whether the application C is installed in the smartphone 20.

In the example shown in FIG. 7, the application C is installed in the smartphone 20, and the vehicle/user conditions satisfy the application C activation conditions. However, in the smartphone 20, the application B is in execution. Further, since it is not desirable that the user concentrates on operating the smartphone 20 when driving the vehicle, in this embodiment, as a general rule, only one application is allowed to be executed at a time in the smartphone 20.

The application control IF 122 compares the priority of the application B and that of the application C defined in the application management information. In the example shown in FIG. 7, priority of the application C is higher. Therefore, the application control IF 122 transmits an application B termination request to the smartphone 20. The smartphone 20 terminates the application B in accordance with the application termination request received from the application control IF 122, and notifies the application control IF 122 that the application B is terminated. The application control IF 122 transfers the termination notification received from the smartphone 20 to the component b. After receiving the termination notification, the component b cuts communication with the smartphone 20, and terminates execution of the application B in cooperation with the smartphone 20. Further, the application control IF 122 transmits an application C activation request to the smartphone 20. After activating the application C in accordance with the received activation request from the application control IF 122, the smartphone 20 notifies the application control IF 122 that the application is activated. The application control IF 122 transfers the notification received from the smartphone 20 to the component c. After receiving the activation notification, the component c communicates with the smartphone 20 via the application control IF 122, and executes the application C in cooperation with the smartphone 20.

A case when the priority of the application B is higher is considered. In this case, the application control IF 122 does not transmit the application B closing request and the application C activation request to the smartphone 20. Therefore, execution of the application B in the smartphone 20 continues. The application control IF 122 notifies the component c that the application C was not activated. The component c cognizes that the application C was not executed in the smartphone 20 by receiving the notification.

It should be noted that, if applications do not substantially interrupt a driving operation of the vehicle, a plurality of applications may be executed at a time in the smartphone 20. For example, applications that are executed while the vehicle is parked or applications that only display information could be executed simultaneously with other applications.

Specific Examples of Applications

Next, specific examples of applications are explained.

(1) IC (Interchange) Selection Application

Figure 8:
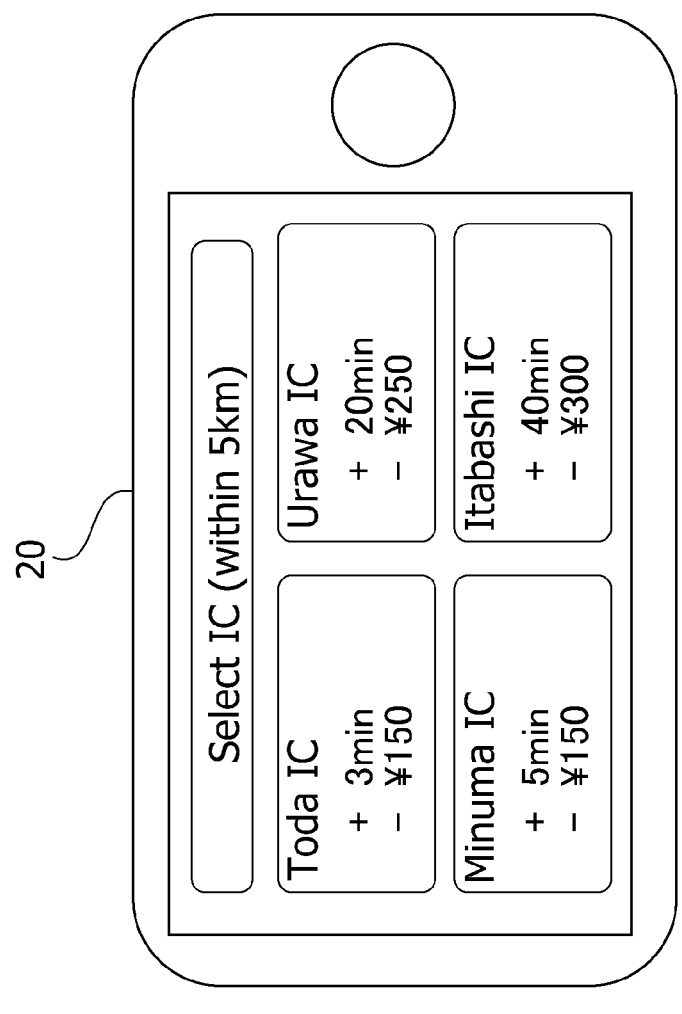
FIG. 8 is a diagram for explanation of an exemplary operation of an IC selection application.
Figure 8:
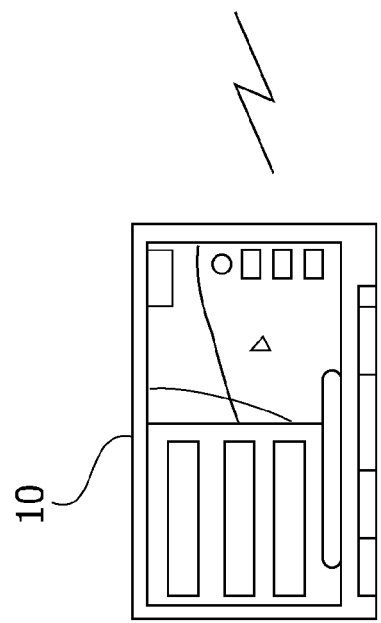
Figure 9:
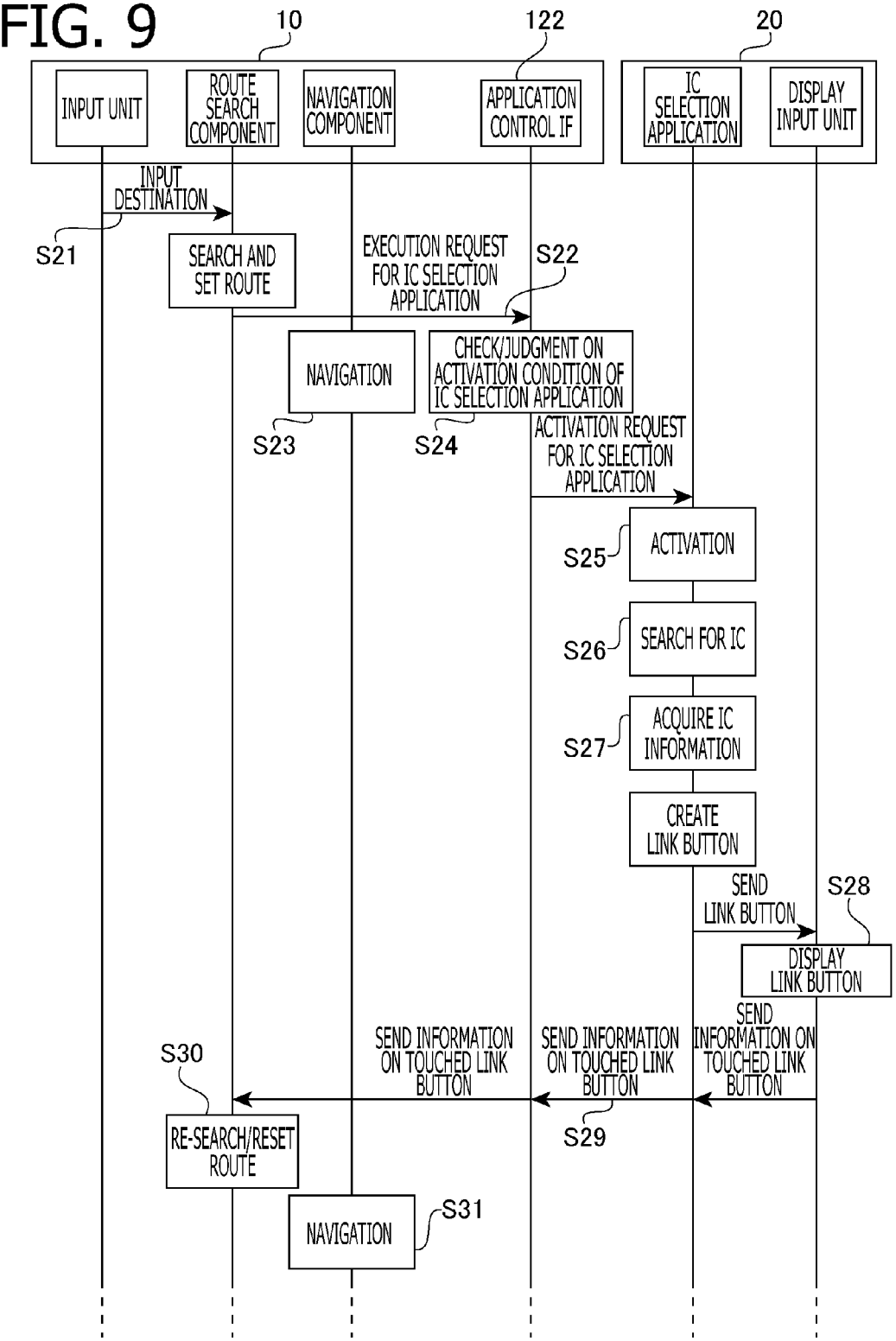
FIG. 9 shows a sequence of activation and execution of the IC selection application.

FIG. 8 is an explanatory illustration for explaining an example of operation of an IC selection application. The IC selection application is an application for letting a user select an IC through which the vehicle travels. FIG. 9 is a sequence diagram illustrating activation and execution of the IC selection application. In the sequence shown in FIG. 9, the navigation device 10 is illustrated in four functional blocks of "input unit", "route search component", "navigation component" and "application control IF 122", and the smartphone 20 is illustrated in two functional blocks of "IC selection application" and "display input unit".

S21 (Input of Destination) in FIG. 9

When a destination is inputted by the user through operation to the UI 106, the input unit sends the inputted destination to the route search component.

S22 (Execution Request for IC Selection Application) in FIG. 9

The route search component accesses the map data, and searches a route from the current position of the vehicle to the destination and sets the route. When the set route is one traveling through an IC, the route search component sends an execution request for the IC selection application to the application control IF 122.

S23 (Navigation of Route) in FIG. 9

The navigation component executes navigation for the route set by the route search component. On the LCD 114 of the navigation device 10, navigation information is displayed by execution of a navigation process by the navigation component until the vehicle arrives at the destination.

S24 (Determination of Activation of IC Selection Application) in FIG. 9

The application control IF 122 checks the notification received at the step S12 (application inquiry) in FIG. 4 to determine whether the IC selection application is installed in the smartphone 20. When the application control IF 122 determines that the IC selection application is installed in the smartphone 20, the application control IF 122 obtains the activation conditions for the IC selection application defined in the application management information. The application control IF 122 determines whether the vehicle/user conditions satisfy the activation condition of the IC selection application, and only when it is determined that the vehicle/user conditions satisfy the activation conditions, the application control IF 122 transmits the activation request for the IC selection application to the smartphone 20.

S25 (Activation of IC Selection Application) in FIG. 9

On the smartphone 20, the IC selection application is activated in response to the activation request received from the application control IF 122.

S26 (Search for IC) in FIG. 9

After being activated in response to the activation request, the IC selection application obtains the information regarding the set route and the current position from the navigation device 10. The information regarding the current position may be calculated on the smartphone 20 using the GPS receiver 212. The IC selection application accesses the map data of the navigation device 10 via the application control IF 122, and searches for candidate ICs (e.g., ICs situated within a predetermined distance range from the set route or the current position) using the information of the set route and the current position. In place of the map data of the navigation device 10, the IC selection application may access, for example, a map server located on the internet and then search for ICs.

S27 (Acquisition of IC Information) in FIG. 9

The IC selection application obtains information regarding names and tolls of the searched candidate ICs from the map data or the map server on the internet, and the IC selection application calculates the difference between the toll required for using the IC on the currently set route and the toll required for using the candidate IC. Further, the IC selection application calculates the time difference between a scheduled traveling time for the set route and a scheduled traveling time required for going through the candidate IC. For example, the IC selection application simply calculates, as the time difference, the time corresponding to the distance between the IC on the set route and the candidate IC. Further, the IC selection application may require the navigation device 10 or a predetermined server on the internet to calculate the scheduled traveling time for the set route and the scheduled traveling time required for going through the candidate IC, and may calculate the time difference from the calculation results.

S28 (Displaying of IC information) in FIG. 9

The IC selection application creates a link button containing the various information including names of candidate ICs, the difference of tolls, the time difference, and passes the created link button to the display input unit. As shown in FIG. 8, the display input unit displays, on the touch panel 206, link buttons respectively corresponding to the candidates received from the IC selection application. In the example shown in FIG. 8, link buttons of "Toda IC", "Urawa IC", "Minuma IC" and "Itabashi IC" are displayed as candidates.

S29 (Transmission of IC Information) in FIG. 9

When one of the link buttons is touched, the display input unit passes the IC information of the touched link button to the IC selection application. The IC selection application transmits the IC information received from the display input unit to the route search component via the application control IF 122.

S30 (Re-Searching and Resetting of Route) in FIG. 9

The route search component executes the re-searching and resetting so as to travel through the IC indicated by the information received from the IC selection application.

S31 (Navigation) in FIG. 9

The navigation component continues to execute navigation in accordance with the route reset by the route search component. As described above, in this application example, candidate ICs are automatically displayed on the touch panel 206 of the smartphone 20. By simply making a one touch operation to the touch panel 206, the user is able to set the route going through the desired IC. When the user wants the initially set route, the user is not required to operate the touch panel 206. The IC selection application automatically terminates when no operation by the user is made in a predetermined time after displaying of the link buttons. Thus, the link buttons on the touch panel 206 are automatically deleted.

(2) Additional Information Provision Application

Figure 10:
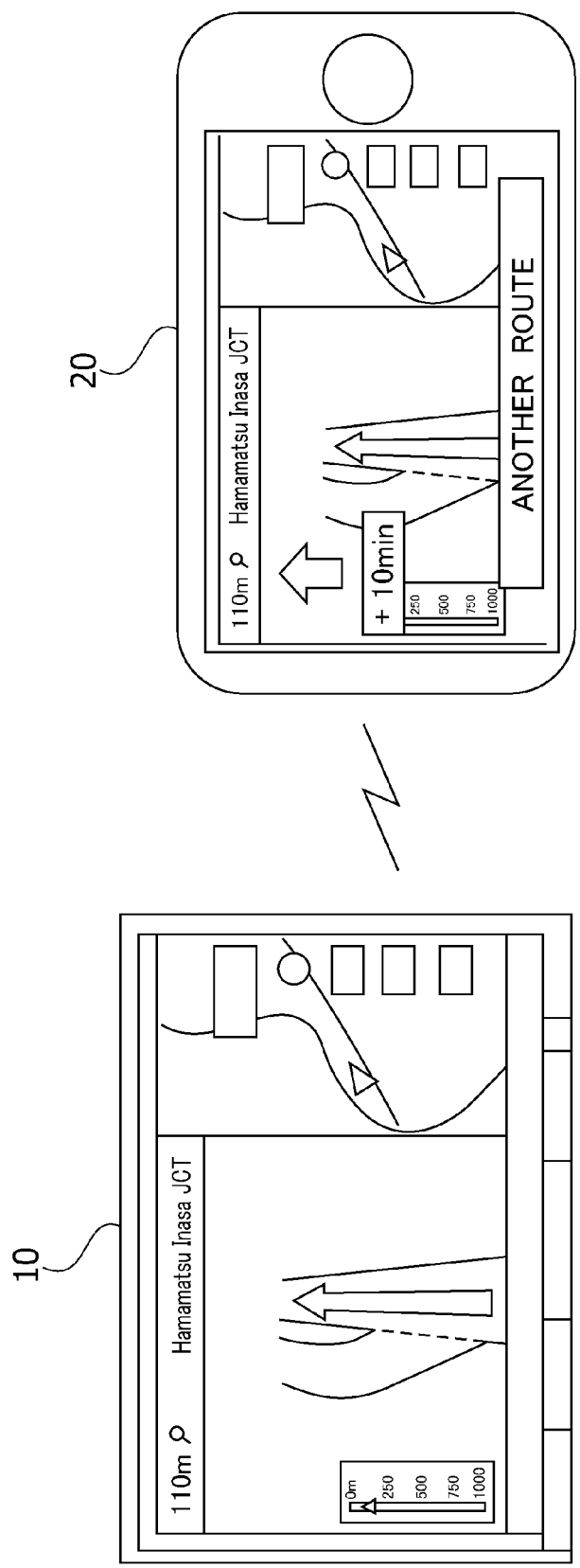
FIG. 10 is a diagram for explanation of an exemplary operation of an additional information provision application.

FIG. 10 is an explanatory illustration for explaining an operation example of the additional information provision application. The additional information provision application is an application for providing additional information for the set route by the navigation device 10.

When the distance between the current position of the vehicle and a next branch point on the set route becomes smaller than or equal to a predetermined distance, the navigation component transmits the execution request for the additional information provision application to the application control IF 122. The application control IF 122 checks the notification received at step S12 (application inquiry) in FIG. 4, and determines whether the additional information provision application is installed in the smartphone 20. When the application control IF 122 determines that the additional information provision application is installed in the smartphone 20, the application control IF 122 obtains the activation condition for the additional information provision application defined in the application management information. The application control IF 122 determines whether the vehicle/user condition satisfies the activation condition for the additional information provision application. Only when it is determined that the vehicle/user condition satisfies the activation condition for the additional information provision application, the application control IF 122 transmits the activation request for the additional information provision application to the smartphone 20.

On the smartphone 20, the additional information provision application is activated in response to the activation request received from the application control IF 122. After the additional information provision application is activated in response to the activation request, the additional information provision application obtains the information regarding the set route and the current position from the navigation device 10. The additional information provision application accesses the map data of the navigation device 10 via the application control IF 122, searches for routes (hereafter, referred to as "non-route") that would deviate from the set route at a next branch point, and calculates change of the required time and distance to the destination defined when the vehicle travels along the searched non-route (i.e., change with respect to the required time and distance for the currently set route).

As shown in FIG. 10, the additional information provision application displays, on the touch panel 206, the information regarding the non-route different from the route displayed on the LCD 114 and the change of the required time and distance to the destination defined when the vehicle travels along the non-route. By visually recognizing the information displayed on the touch panel 206, it is possible to grasp the required time, for example, when dropping in on the way or to consider an indirect route.

(3) Route Control Application

Figure 11:
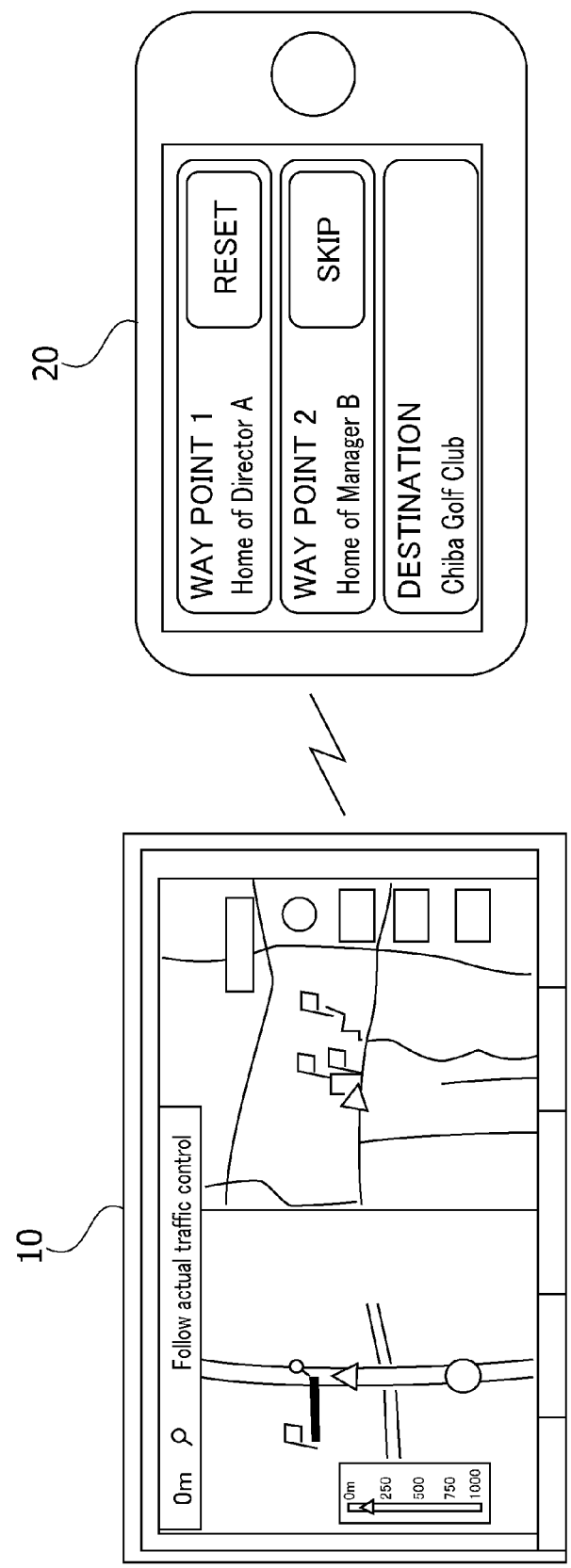
FIG. 11 is a diagram for explanation of an exemplary operation of a route control application.

FIG. 11 is an explanatory illustration for explaining an operation example of the route control application. As a prerequisite for this application example, the set route goes through at least one way point designated by the user. The route control application is an application for controlling such a set route.

When the navigation component determines that the vehicle has traveled without going through the way point set by the user, the navigation component transmits the execution request for the route control application to the application control IF 122. The application control IF 122 checks the notification received at step S12 (application inquiry) in FIG. 4, and determines whether the route control application is installed in the smartphone 20. When the application control IF 122 determines that the route control application is installed in the smartphone 20, the application control IF 122 obtains the activation condition for the route control application defined in the application management information. The application control IF 122 determines whether the vehicle/user condition satisfies the activation condition for the route control application, and only when the application control IF 122 determines that the vehicle/user condition satisfies the activation condition, the application control IF 122 transmits the activation request for the route control application to the smartphone 20.

On the smartphone 20, the route control application is activated in response to the activation request received from the application control IF 122. After being activated in response to the activation request, the route control application obtains the information regarding the way point designated by the user from the navigation device 10. Further, the route control application may access the map data of the navigation device 10, and may estimate the way point designated by the user which the vehicle did not go through, based on the information regarding the set route and the current position.

As shown in FIG. 11, the route control application displays the link button of the thus obtained or the thus estimated way point (a way point list for a plurality of way points) on the touch panel 206 of the smartphone 20. In the link button of the way point, the "reset" button and the "skip" button are buried. When the "reset" button is touched, the route control application requests the route search component to recalculate the route which goes through the way point. When the "skip" button is touched, the route control application requests the route search component to recalculate the route which skips the way point. The route search component executes the re-searching and resetting of the route based on the request received from the route control application. The navigation component continues the navigation in accordance with the route reset by the route search component. Thus, in the application example, the way point which is intentionally or unintentionally skipped during the traveling is automatically displayed on the touch panel 206 of the smartphone 20. By simply making a one touch operation to the touch panel 206, the user is able to reset the route which goes through or does not go through the way point. It should be noted that when the user wants the currently set route, the user is not required to operate the touch panel 206. The route control application automatically terminates when no operation is made by the user in a constant time after displaying of the link buttons. As a result, the link buttons on the touch panel 206 are automatically deleted.

(4) Vehicle Position Correction Application

Figure 12:
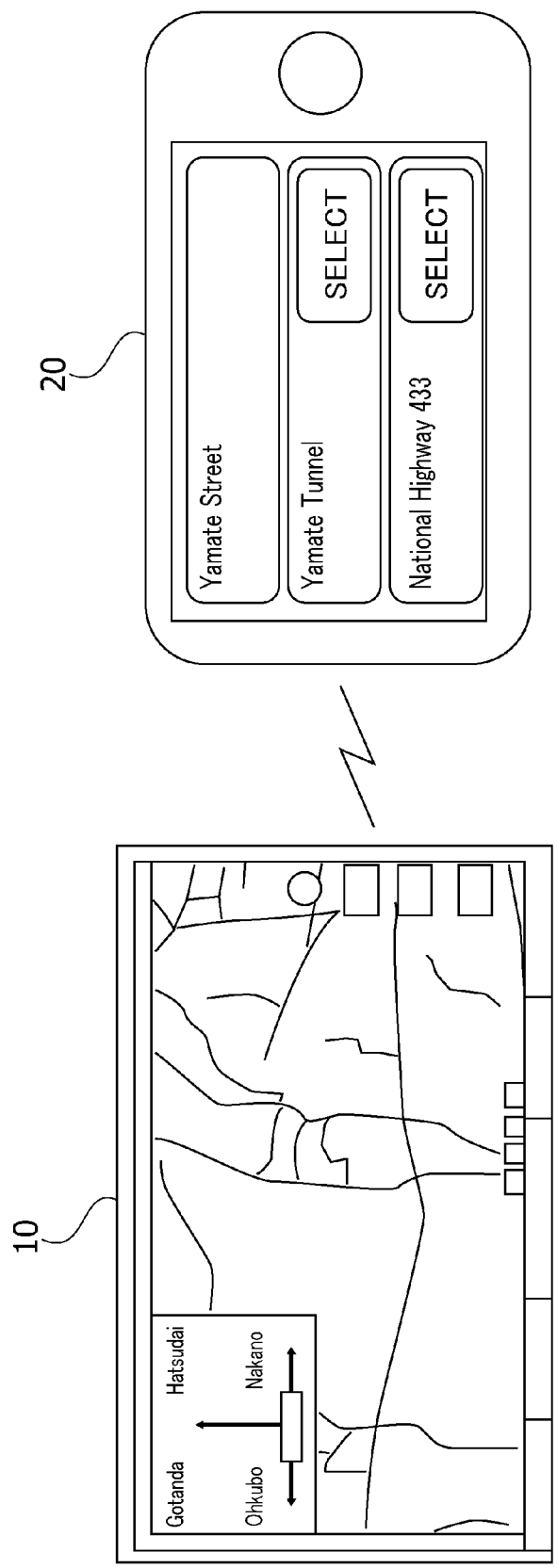
FIG. 12 is a diagram for explanation of an exemplary operation of a vehicle position correction application.

FIG. 12 is an explanatory illustration for explaining an operation example for the vehicle position correction application. The vehicle position correction application is an application for correcting the vehicle position being subjected to map matching.

When it is determined that the accuracy of the map matching decreased, the navigation component transmits the execution request for the vehicle position correction application to the application control IF 122. Whether or not the accuracy of the map matching decreases can be determined, for example, based on the positional relationship between the road to which the vehicle is matched and the neighboring roads or the measurement accuracy of the current position. The application control IF 122 checks the notification received at the step S12 (application inquiry) in FIG. 4, and determines whether the vehicle position correction application is installed in the smartphone 20. When it is determined that the vehicle position correction application is installed in the smartphone 20, the application control IF 122 obtains the activation condition for the vehicle position correction application defined in the application management information. The application control IF 122 determines whether the vehicle/user condition satisfies the activation condition for the vehicle position correction application, and only when the vehicle/user condition satisfies the activation condition, the application control IF 122 transmits the activation request for the vehicle position correction application to the smartphone 20.

On the smartphone 20, the vehicle position correction application is activated in response to the activation request received from the application control IF 122. After being activated in response to the activation request, the vehicle position correction application obtains the information regarding the set route and the current position from the navigation device 10. The vehicle position correction application accesses the map data of the navigation device 10 via the application control IF 122, and searches for the road on which the vehicle is currently traveling and roads that are arranged side by side the current road, by using the information regarding the set route and the current position. For example, when the vehicle is traveling on the elevated express way, a local street under the elevated express way is searched. When the vehicle is traveling along a road on the ground, an underground road under the road on the ground is searched (e.g., Yamate tunnel is searched when the vehicle is traveling along the Yamate street).

As shown in FIG. 12, the vehicle position correction application displays the link button for the searched road on the touch panel 206 of the smartphone 20. When the link button for one of the roads is touched, the vehicle position correction application notifies the navigation component of the information regarding the road. The navigation component executes the matching to move the vehicle's position toward the road notified from the vehicle position correction application. As described above, in this application example, the roads for matching candidates are automatically displayed on the touch panel 206 of the smartphone 20, under the situation where the possibility of unmatching is high. The user is able to match the vehicle's position with a proper road by only making a one touch operation to the touch panel 206. The vehicle position correction application automatically terminates after the vehicle has passed the road displayed as a matching candidate. Thus, the link button on the touch panel 206 is automatically deleted.

(5) Other Applications

As another application example, an application that searches for a near-by restaurant and provides a voice guidance is considered, for example. The voice guidance of the application of this type is reproduced via the speaker 216 of the smartphone 20. Therefore, depending on the timing of reproduction of the voice guidance, the voice guidance may overlap with the voice route guidance reproduced by the navigation device 10. For this reason, in order to achieve cooperation between the navigation component and the application and to avoid interference between the voices of the navigation component and the application, for example, the voice guidance by the application is temporarily stopped during the voice route guidance by the navigation component. In addition to the function of searching for near-by restaurants from the current position, the restaurant guide application has the function of narrowing down the near-by restaurants to be guided based on user's behavior, a user's preference pattern or the like.

According to the above described embodiment, a desired application is automatically selected from among a plurality of applications in accordance with the vehicle/user condition and is started and executed. Therefore, decrease of operability of the navigation device 10 and the smartphone 20 due to increase of functions can be prevented. Since the user is able to concentrate on driving operation for the vehicle without being forced to conduct complicated user operations even when the number of functions added to the smartphone 20 is large, decrease of driving safety due to the complicated operations can be prevented. Further, in the above described embodiment, the user is able to add only required applications to the information processing cooperation system 1 (namely, to the smartphone 20). Therefore, both of customizing of functions for each user and deletion of unnecessary functions can be achieved simultaneously. Furthermore, in the above described embodiment, an added application is displayed on the touch panel 206 of the smartphone 20. Therefore, there is no necessity to reduce the display area for the navigation information displayed on the LCD 114 of the navigation device 10 when the added application is displayed.

The foregoing is explanations about the embodiment of the invention. It is understood that the invention is not limited to the above described embodiment, but can be varied in various ways within the scope of the invention. For example, a combination obtained by appropriately combining examples explicitly described in this specification and/or matters derived from the explicitly explained examples is also regarded as an embodiment of the invention.

In the above described embodiment, each component of the navigation device 10 issues the execution request for an application; however, in another embodiment the smartphone 20 itself may issue the execution request for an application.

In the above described embodiment, the application and each component of the navigation device 10 exchanges information via the application control IF 122; however, in another embodiment the application and each component may directly exchange information after activation of the application.

What is claimed is:

1. An information processing terminal communicating with an external information processing terminal, the external information processing terminal having a plurality of types of applications, the information processing terminal comprising:
a condition determination unit configured to determine current conditions of at least one of a vehicle on which the information processing terminal is mounted and a user riding on the vehicle;
an activation control unit configured to transmit, depending on the determined current conditions, an activation request for activating at least one of the plurality of types of applications to the external information processing terminal, and thereby to let the external information processing terminal activate an application corresponding to the activation request the activation control unit having modifiable activation conditions used to judge whether to activate respective ones of the plurality of types of applications;
a cooperation unit configured to execute the activated application in cooperation with the external information processing terminal, and to let the external information processing terminal to display, on a screen of the external information processing terminal, the information concerning the current conditions of at least one of the user and the vehicle on which the information processing terminal is mounted wherein:
the plurality of types of applications are assigned respective priority orders;
when the current condition determined by the condition determination unit satisfies the activation condition for another application during execution of the application by the external information processing terminal, the priority order of the application being executed and the priority order of the other application are compared, and (A) when the priority order of the application being executed is higher than that of another application, the activation control unit lets the external information processing terminal continue to execute the application by not transmitting the activation request for another application to the external information processing terminal; and (B) when the priority order of another application is higher than that of the application being executed, the activation control unit transmits a termination request for the application being executed to the external information processing terminal, and when receiving a termination notification of the application from the external information processing terminal, the activation control unit transmits an activation request for another application to the external information processing terminal.

2. The information processing terminal according to claim 1,
further comprising: an application management information providing unit configured to hold application management information containing activation conditions for respective ones of the plurality of types of applications of the external information processing terminal or to acquire the application management information from the external information processing terminal or a predetermined information processing terminal which is different from the external information processing terminal, wherein the activation control unit is configured to:

issue an execution request for an application;

determine whether the current condition determined by the condition determination unit satisfies the activation condition for an application for which the execution request is received by referring to the application management information; and transmit, to the external information processing terminal, the activation request for the application for which the execution request is received when it is determined that the activation condition is satisfied.

3. The information processing terminal according to claim 1, further comprising an operation result receiving unit configured to receive an operation result by the user with respect to the application being executed on the external information processing terminal; and a navigation process execution unit configured to execute measurement for obtaining a current position of the vehicle, search and set a route from the measured current position to a destination, and execute a navigation process in accordance with the set route, wherein the navigation process execution unit executes the navigation process while taking into account the operation result by the user received from the external information processing terminal.

4. The information processing terminal according to claim 1, wherein the cooperation unit is configured to receive data from the external information processing terminal, the data being inputted to the external information processing terminal through a user operation.

5. A non-transitory computer readable medium having computer readable instruction stored thereon, which, when executed by a processor of an information processing terminal communicating with an external information processing terminal, the external information processing terminal having a plurality of types of applications, configures the processor to perform the steps of:

judging, with modifiable activation conditions, current conditions of at least one of a vehicle and a user riding on the vehicle on which the information processing terminal is mounted;

transmitting, depending on the determined current conditions, an activation request for activating at least one of the plurality of types of applications to the external information processing terminal, and thereby letting the external information processing terminal activate an application corresponding to the activation request;

executing the activated application in cooperation with the external information processing terminal, and letting the external information processing terminal to display, on a screen of the external information processing terminal, the information concerning the current conditions of at least one of the user and the vehicle on which the information processing terminal is mounted wherein:

the plurality of types of applications are assigned respective priority orders;

when the current condition determined by the condition determination unit satisfies the activation condition for another application during execution of the application by the external information processing terminal, comparing the priority order of the application being executed and the priority order of the other application:

(A) when the priority order of the application being executed is higher than that of another application, letting the external information processing terminal continue to execute the application by not transmitting the activation request for another application to the external information processing terminal; and (B) when the priority order of another application is higher than that of the application being executed, transmitting a termination request for the application being executed to the external information processing terminal, and when receiving a termination notification of the application from the external information processing terminal, transmitting an activation request for another application to the external information processing terminal.

6. The non-transitory computer readable medium according to claim 5, further comprising the step of:

holding application management information containing activation conditions for respective ones of the plurality of types of applications of the external information processing terminal or acquiring the application management information from the external information processing terminal or a predetermined information processing terminal which is different from the external information processing terminal, wherein in the step of transmitting the activation request, issuing an execution request for an application;

judging whether the current condition determined by the step of judging satisfies the activation condition for an application for which the execution request is received by referring to the application management information; and transmitting, to the external information processing terminal, the activation request for the application for which the execution request is received when it is determined that the activation condition is satisfied.

7. The non-transitory computer readable medium according to claim 5, further comprising the step of:

receiving an operation result by the user with respect to the application being executed on the external information processing terminal; and executing measurement for obtaining a current position of the vehicle, searching and setting a route from the measured current position to a destination, and executing a navigation process in accordance with the set route, wherein, in the step of executing the measurement, the navigation process is executed while taking into account the operation result by the user received from the external information processing terminal.

8. The non-transitory computer readable medium according to claim 5, wherein the computer readable instructions are configured to receive data from the information processing terminal, inputted through a user operation.

* * * * *